United States Patent [19]

Strand

[11] Patent Number: 4,660,175

[45] Date of Patent: Apr. 21, 1987

[54] DATA STORAGE DEVICE HAVING NOVEL BARRIER LAYERS ENCAPSULATING THE DATA STORAGE MEDIUM

[75] Inventor: David Strand, West Bloomfield, Mich.

[73] Assignee: Energy Conversion Devices, Inc., Troy, Mich.

[21] Appl. No.: 752,741

[22] Filed: Jul. 8, 1985

[51] Int. Cl.$^4$ .............................................. G11C 13/00
[52] U.S. Cl. .................................. 365/113; 365/163; 369/275
[58] Field of Search .................... 365/113, 163; 357/2, 357/16; 369/275; 346/137, 135.1

[56] References Cited

U.S. PATENT DOCUMENTS 3,626,386 12/1971 Feinleib .............................. 365/113
3,778,785 12/1973 von Gutfeld ........................ 365/113

OTHER PUBLICATIONS

A. W. Smith, "Injection Laser Writing on Chalcogenide Films", Applied Optics, vol. 13, No. 4, Apr. 1974, pp. 795–798.

Primary Examiner—Joseph A. Popek
Attorney, Agent, or Firm—Richard M. Goldman; Judith M. Riley

[57] ABSTRACT

Disclosed is a data storage device having a chalcogen-data storage medium encapsulated along at least one surface, and preferably both surfaces, by a dielectric barrier layer. The dielectric is compositionally graded in oxygen content with respect to the chalcogen data storage medium. The dielectric is a substantially stoichiometric oxide in proximity to the chalocogen data storage medium, and a substantially non-stoichiometric suboxide remote from the chalcogenide data storage medium. The resulting data storage device is relatively moisture blocking and non-reactive with the chalcogen-data storage medium. Also disclosed are methods of making and using the data storage device.

16 Claims, 3 Drawing Figures

DATA STORAGE DEVICE HAVING NOVEL BARRIER LAYERS ENCAPSULATING THE DATA STORAGE MEDIUM

FIELD OF THE INVENTION

The invention disclosed herein relates to data storage devices, where data is stored in a material that is reversibly switchable between detectable states by the application of projected beam energy thereto.

BACKGROUND OF THE INVENTION

Nonablative state changeable data storage systems, for example, optical data storage systems, record information in a state changeable material that is switchable between at least two detectable states by the application of projected beam energy thereto, for example, optical energy.

State changeable data storage material is incorporated in a data storage device having a structure such that the data storage material is supported by a substrate and encapsulated in encapsulants. In the case of optical data storage devices the encapsulants include, for example, anti-ablation materials and layers, thermal insulation materials and layers, anti-reflection layers and materials, reflective layers, and chemical isolation layers. Moreover, various layers may perform more than one of these functions. For example, anti-reflection layers may also be anti-ablation layers and thermal insulating layers. The thicknesses of the layers, including the layer of state changeable data storage material, are optimized to minimize the energy necessary for state change and optimize the high contrast ratio, high carrier to noise ratio, and high stability of state changeable data storage materials.

The state changeable material is a material capable of being switched from one detectable state to another detectable state or states by the application of projected beam energy thereto. State changeable materials are such that the detectable states may differ in their morphology, surface topography, relative degree of order, relative degree of disorder, electrical properties, optical properties including indices of refraction and reflectivities, or combinations of one or more of these properties. The state of state changeable material is detectable by the electrical conductivity, electrical resistivity, optical transmissivity, optical absorption, optical refraction, optical reflectivity, or combinations thereof.

Formation of the data storage device includes deposition of the individual layes, for example by evaporative deposition, chemical vapor deposition, and/or plasma deposition. As used herein plasma deposition includes sputtering, glow discharge, and plasma assisted chemical vapor deposition.

Tellurium based materials have been utilized as phase changeable materials. This effect is described, for example, in J. Feinleib, J. deNeufville, S. C. Moss, and S. R. Ovshinsky, "Rapid Reversible Light-Induced Crystallization of Amorphous Semiconductors", *Appl. Phys. Lett.*, Vol. 18(6), pages 254-257 (Mar. 15, 1971), in J. Feinleib, S. Iwasa, S. C. Moss, J. P. deNeufville, and S. R. Ovshinsky, "Reversible Optical Effects In Amorphous Semiconductors", *J. Non-Crystalline Solids,* Vol. 8-10, pages 909-916 (1972), and in U.S. Pat. No. 3,530,441 to S. R. Ovshinsky for *Method and Apparatus For Storing And Retrieving Of Information.* A recent description of tellurium-germanium-tin systems, without oxygen, is in M. Chen, K. A. Rubin, V. Marrello, U. G. Gerber, and V. B. Jipson, "Reversibility And Stability of Tellurium Alloys for Optical Data Storage," *Appl. Phys. Lett.*, Vol. 46(8), pages 734-736 (Apr. 15, 1985). A recent description of tellurium-germanium-tin systems with oxygen is in M. Takenaga, N. Yamada, S. Ohara, K. Nishiciuchi, M. Nagashima, T. Kashibara, S. Nakamura, and T. Yamashita, "New Optical Erasable Medium Using Tellurium Suboxide Thin Film", Proceedings, SPIE Conference on Optical Data Storage, Arlington, VA, 1983, pages 173-177.

Tellurium based state changeable materials, in general, are single or multi-phased systems (1) where the ordering phenomena include a nucleation and growth process (including both or either homogeneous and heterogeneous nucleations) to convert a system of disordered materials to a system of ordered and disordered materials, and (2) where the vitrification phenomenon includes melting and rapid quenching of the phase changeable material to transform a system of disordered and ordered materials to a system of largely disordered materials. The above phase changes and separations occur over relatively small distances, with intimate interlocking of the phases and gross structural discrimination, and are highly sensitive to local variations in stoichiometry.

A major limitation of using state change materials for optical data storage is the sensitivity of the optical data storage medium to local changes in stoichiometry. For example, where the encapsulating layer in contact with the chalcogen state changeable memory material is germanium oxide, the germanium oxide must be substantially stoichiometric $GeO_2$ in order to avoid either the diffusion of germanium into the state changeable chalcogenide data storage medium or the diffusion of oxygen out of the state changeable chalcogen data storage medium into the $GeO_x$. However, substantially stoichiometric germanium dioxide, while useful in layered optical data storage structures is water permeable.

SUMMARY OF THE INVENTION

According to the invention herein comtemplated there is provided a data storage device having a chalcogen data storage medium, a substrate supporting the medium, and a dielectric film encapsulating the chalcogen data storage medium. The dielectric film encapsulating the data storage medium is a compositionally graded or layered dielectric, generally an oxide. That is, the film is compositionally graded or layered in oxygen content with respect to distance from the calcogen data storage medium. By compositionally graded oxides are meant both monotonically and step-wise graded, i.e., layered, oxides. The oxide in contact with the chalcogen storage medium is a substantially stoichiometric dielectric, e.g., germanium dioxide, $GeO_2$. The dielectric, e.g., germanium oxide, remote from the chalcogenide data storage medium is a substantially non-stoichiometric dielectric, e.g., germanium suboxide.

The dielectric barrier layer, for example, germanium oxide and suboxide, may serve as a thermal isolation layer, an optical coupling layer, and a chemical barrier, especially a moisture barrier. While the dielectric may be silicon nitride, silicon oxide, aluminum oxide, or mixtures thereof, germanium oxide is preferred. For example, germanium suboxide, with stoichiometry, $GeO_x$, x being from about 1.5 to 1.95 is a moisture barrier, preventing the diffusion of water into the chalcogenide. However, germanium suboxide is associated with the diffusion of germanium into the chalcogenide data storage medium and/or the diffusion of oxygen out of the chalcogenide data storage medium. While the problem of diffusion between the chalcogenide data storage medium and the dielectric layer is obviated by the use of substantially stoichiometric GeO$_2$, substantially stoichiometric GeO$_2$ is an ineffective moisture barrier, being permeable to moisture. The moisture diffusing through the substantially stoichiometric GeO$_2$ permanently damages the chalcogen data storage medium. These problems are obviated where the germanium oxide encapsulating layer or barrier layer is substantially stoichiometric germanium dioxide in proximity to the chalcogen data storage medium and is a non-stoichiometric germanium sub-oxide remote from the data storage medium.

In a further exemplification of the invention a data storage device having a chalcogen data storage medium, a substrate supporting the data storage medium, and germanium oxide films encapsulating the chalcogen data storage medium is formed in a process including the steps of depositing the chalcogenide data storage medium and depositing a compositionally graded or layered dielectric encapsulating films, e.g., germanium oxide and suboxide films. The portion of the compositionally graded or layered encapsulating film in contact with the chalcogenide data storage medium are substantially stoichiometric. The portion of the compositionally graded, encapsulating, dielectric film remote from the chalcogenide are substantially non-stoichiometric dielectric, e.g., germanium sub-oxide, as GeO$_x$, where x is from about 1.5 to about 1.95.

In a further exemplification one or more of writing data into a data storage device, reading data from the data storage device, or erasing storage from the data storage device is performed. The method comprises writing data into the data storage medium with electromagnetic energy of a first energy density and duration, reading the state of the data storage medium with electromagnetic energy of a second energy density, and erasing data from the data storage medium with electromagnetic energy of a third energy density and duration.

Exemplary chalcogenide compositions useful in providing the chalcogenide data storage medium include tellurium, for example, where the tellurium is present with a cross linking agent or agents. The chalcogenide composition is reversibly switchable between (1) a substantially amorphous, first tellurium-cross linking agent composition and (2) a more ordered tellurium composition, possibly locally precipitated, in the presence of an amorphous, second tellurium-cross linking agent composition.

Suitable cross linking agents are elements of groups IIIB, IVB, and VB of the Periodic Table. These include aluminium, indium, and gallium from Group IIIB, silicon, germanium and tin from Group IVB, nitrogen, phosphorous, arsenic, antimony, and bismuth from Group VB, as well as combinations thereof. Exemplary cross linking agents from Groups IIIB, IVB, and VB of the periodic table include silicon, germanium, tin, arsenic, antimony, and mixtures thereof, expecially silicon, and/or germanium, either alone or with one or more of tin, arsenic, or antimony. Especially preferred is germanium, either alone, or with tin. Additionally, further light chalcogen, as selenium and sulphur, may be present.

Exemplary chalcogenide compositions include the chalcogen e.g. tellurium, and a cross linking agent, e.g. silicon and/or germanium, or silicon and/or germanium with another cross linking agent in the medium sufficient to form a stable chalcoginide. Additionally oxygen, or a switching modulator, as Ni, Pt, or Pd, may be present. Generally, the atomic ratio of the cross linking agent to total composition is from about 1 percent to about 20 atomic percent.

The data storage medium may be formed by depositing the materials to form a substantially uniform deposit thereof. The deposit may be from about 100 to about 1500 or more angstroms thick.

THE FIGURES

The invention may be particularly understood by reference to the figures apended hereto.

DETAILED DESCRIPTION OF THE INVENTION

According to the invention described herein, there is provided a projected beam storage device having a data storage medium switchable between detectable states by the application of projected beam energy thereto.

Figure 1:
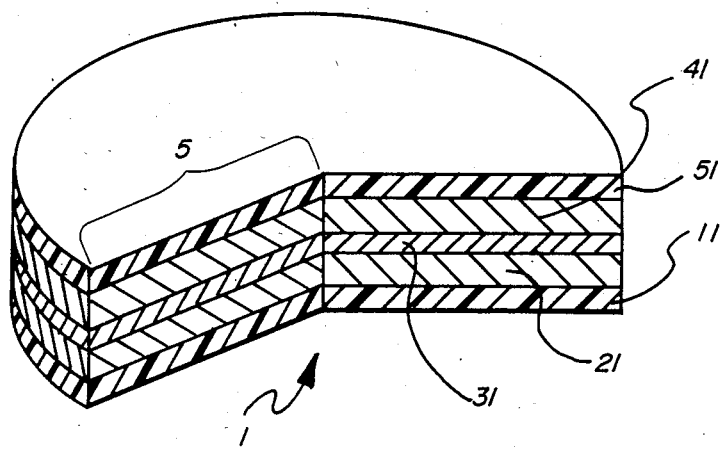
FIG. 1 is a partial cut away isometric view, not to scale, with exaggerated latitudinal dimensions and vertical scale, of an optical data storage device.

FIG. 1 shows a projected beam data storage device 1 having a substrate, for example a plastic substrate 11, a first encapsulating dielectric layer 21, for example a first graded or layered germanium oxide encapsulating layer, a chalcogenide data storage medium layer 31, a second graded or layered dielectric layer 41, e.g., a second graded or layered germanium oxide layer 41, and a second plastic substrate 51.

Figure 2:
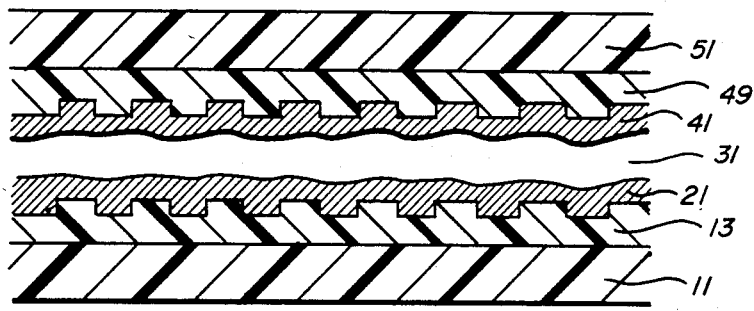
FIG. 2 is a detailed section of the part of the optical data storage device of FIG. 1 showing the relationship of the various layers thereof.

FIG. 2 shows a section of the data storage device 1 of FIG. 1 in greater detail. As there shown, the polymer sheet, for example a polymethylmethacrylate sheet, is an optically invariant, anisotropic, transparent sheet having a thickness such as to prevent optical interference with the projected beam data storage medium from films of dirt, dust, fingerprints, or foreign material. The preferred thickness is of from about 1 mm to about 1.5 mm. Atop the sheet is a second acrylic sheet, for example, an optically polymerized sheet 13 of a photo-initiated, polymerized acrylic material. This sheet 13 has a thickness of from about 30 to about 200 microns and preferably from about 50 to about 100 microns. Polymerized, molded, or cast into the polymeric sheet are grooves having a thickness from about 500 to about 1000 angstroms. Deposited atop the photo-polymerized sheet 13 is a dielectric barrier layer 21. The dielectric barrier layer 21, for example, of germanium oxide, is from about 500 to about 2000 angstroms thick. The dielectric barrier layer 21 has one or more functions. It serves to prevent water from getting to the chalcogenide active layer 31 and prevents the plastic substrate from deforming due to local heating of the chalcogenide layer 31, e.g., during recording or erasing. The barrier layer 21 also serves as an anti-reflective coating, increasing the optical sensitivity of the chalcogenide active layer 31.

As herein contemplated the dielectric layer 21 is graded or layered, e.g., in oxygen content to provide chemical inertness and stability in contact with the optical data storage medium layer 31 and moisture impermability and water insolubility remote therefrom. In the case of germanium oxide, this is a compositional gradiant of $GeO_2$ at the interface with the chalcogenide, and $GeO_x$, where x is from about 1.5 to about 1.95, remote from the active layer 31 and in contact with the plastic layers 13, 49.

The chalcogenide data storage medium 31 has a thickness of from about 100 to about 1500 angstroms. Atop the chalcogenide layer 31 and in contact with the opposite surface thereof is a second graded or layered dielectric layer 41, e.g., a germanium oxide layer. The second graded or layered dielectric layer 41 may, but need not be of equal thickness and composition gradiant as the first layer 21. A second photopolymer layer 49 and a second substrate layer 51 are in contact with the opposite surface of the germanium oxide barrier layer 41.

The polyacrylate layers 13, 49, are cast or molded in place. These layers 13, 49 can be photo-polymerized in place, e.g., by the application of ultra-violet light. The barrier layers 21, 41, are deposited, by evaporation, for example, of germanium and germanium oxide materials, or by sputtering, including reactive sputtering where the oxygen content of the reactive gas used in reactive sputtering is controlled. The chalcogenide film 31 may be prepared by evaporation, or by sputtering, or by chemical vapor deposition.

Figure 3:
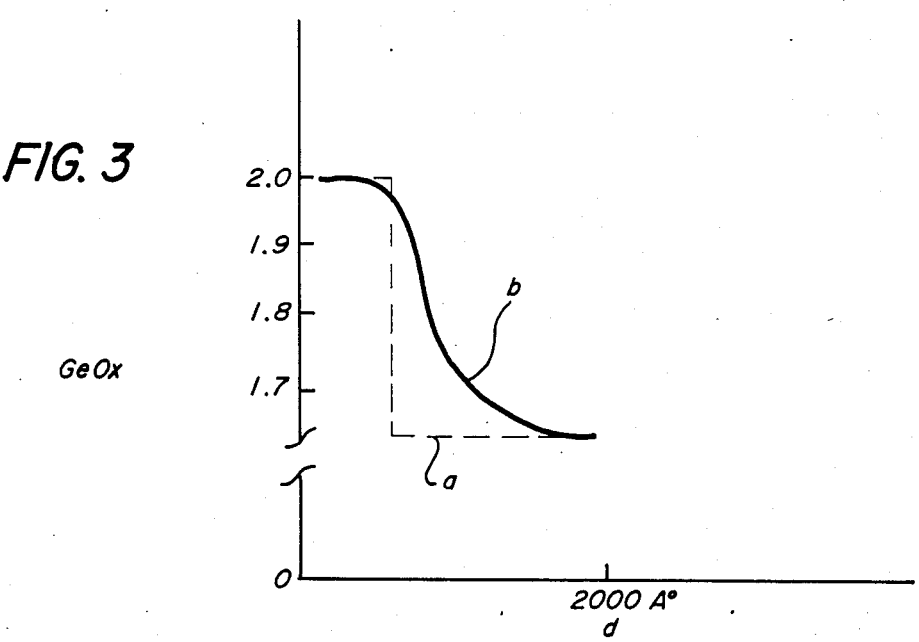
FIG. 3 is a graphical representation of germanium oxide stoichiometry as a function of distance from the chalcogen data storage medium layer.

The germanium oxide film has a composition gradiant, e.g., as shown in FIG. 3. In FIG. 3 the stoichiometry of a film of approximately 2000 angstroms thickness having the stoichiometry $GeO_x$ is shown. The stoichiometric parameter, x, is plotted against distance d. The stoichiometry adjacent to the chalcogenide is substantially stoichiometric $GeO_2$ and thereafter the stoichiometry may be graded by a step function, e.g. layering, as in "a" or a smooth function, as in "b", from about $x = 2.00$ at one boundary to $x = 1.50$ to 1.95 at the other boundary.

Other dielectrics may provide the encapsulating layers 21, 41. For example, the encapsulating layers may be silicon nitride, layered or graded to avoid diffusion of silicon into the chalcogenide layer 31. Alternatively, the encapsulating dielectric layers 21, 41 may be silica, alumina, or other dielectric.

While the invention has been described with respect to certain preferred exemplifications and embodiments thereof it is not intended to be bound thereby but solely by the claims apended hereto.

I claim:

1. A data storage device comprising a chalcogenide data storage medium, a substrate supporting said data storage medium, and a dielectric film encapsulating the data storage medium and in contact therewith at first interfaces, where the dielectric is compositionally graded in oxygen content with respect to distance from the chalcogenide data storage medium, being substantially stoichiometric oxide at the interface with the chalcogenide data storage medium and being a substantially non-stoichiometric suboxide at its opposite interfaces.

2. The data storage device of claim 1 wherein the dielectric is substantially continously compositionally graded in oxygen content.

3. The data storage device of claim 1 wherein the dielectric is layered in oxygen content.

4. The data storage device of claim 1 wherein the dielectric is germanium oxide.

5. The data storage device of claim 4 wherein the geramanium oxide is substantially $GeO_2$ in proximity to the chalcogenide data storage medium.

6. The data storage device of claim 4 wherein the germanium oxide has the stoichiometry $GeO_x$, where the value of x is from 1.5 to 1.95 at the interfaces with the substrate.

7. A method of doing one or more of writing data into, reading data from, or erasing data from a data storage device comprising a chalcogenide data storage medium, a substrate supporting said chalcogenide data storage medium, and a dielectric film encapsulating the chalcogenide data storage medium, the dielectric being compositionally graded in oxygen content with respect to distance from the chalcogenide data storage medium whereby to be a substantially stoichiometric oxide in proximity to the chalcogenide data storage medium, and a substantially non-stoichiometric suboxide remote from the chalcogenide data storage medium, which method comprises writing data into the data storage medium with electromagnetic energy of a first energy density and duration, reading the state of the data storage medium with electromagnetic energy of a second energy density, and erasing data from the data storage medium with electromagnetic energy of a third energy density and duration.

8. The method of claim 7 wherein the dielectric is substantially continuously compositionally graded in oxygen content.

9. The method of claim 7 wherein the dielectric is layered in oxygen content.

10. The method of claim 7 wherein the dielectric is germanium oxide.

11. The method of claim 10 wherein the germanium oxide is substantially stoichiometric $GeO_2$ in proximity to the chalcogen data storage medium.

12. The method of claim 10 wherein the germanium oxide has the stoichiometry $GeO_x$, where x is from 1.5 to 1.95 remote from the chalcogenide data storage medium.

13. A data storage device comprising a chalcogenide data storage medium, a substrate supporting said data storage medium, and a dielectric film encapsulating the data storage medium, where the dielectric is compositionally graded with respect to distance from the chalcogenide data storage medium, being substantially stoichiometric at its interface with the chalcogenide data storage medium and being substantially non-stoichiometric at its opposite interface.

14. The data storage device of claim 13 wherein the dielectric is substantially continously compositionally graded.

15. The data storage device of claim 13 wherein the dielectric is layered.

16. The data storage device of claim 13 wherein the dielectric is chosen from the group consisting of silicon nitrides, silica, alumina, and mixtures thereof.

* * * * *